United States Patent [19]
Murayama et al.

[11] Patent Number: 5,258,886
[45] Date of Patent: Nov. 2, 1993

[54] THIN FILM CAPACITOR AND APPARATUS FOR MANUFACTURING SAME

[75] Inventors: Yoichi Murayama, 304, Domusu Mejiro, 17-44, Shimoochiai 3-chome, Shinjuku-ku, Tokyo; Kunihiro Kashiwagi, Shiki; Yasuhiko Yoshida, Saitama, all of Japan

[73] Assignees: C. Itoh Fine Chemical Co., Ltd.; Yoichi Murayama, both of Tokyo, Japan

[21] Appl. No.: 900,372

[22] Filed: Jun. 18, 1992

[30] Foreign Application Priority Data

May 25, 1992 [JP] Japan ................... 4-132733

[51] Int. Cl.$^5$ .............. H01G 4/10; H01G 4/12; H01G 7/00
[52] U.S. Cl. .................. 361/321.5; 361/311; 29/25.42
[58] Field of Search ........ 361/320, 321, 323; 437/235, 238; 427/38, 39; 204/164; 29/25.42

[56] References Cited

U.S. PATENT DOCUMENTS

| | | | |
|---|---|---|---|
| 3,609,482 | 9/1971 | Edelman et al. | 361/320 |
| 3,665,269 | 5/1972 | Wright et al. | 361/323 |
| 3,699,409 | 10/1972 | Feuersanger et al. | 357/10 |
| 4,406,765 | 9/1983 | Higashi et al. | 204/164 |
| 5,128,173 | 7/1992 | Kugan | 427/38 |

FOREIGN PATENT DOCUMENTS

62-24507 2/1987 Japan.
1-174504 7/1989 Japan.

OTHER PUBLICATIONS

"Hybrid Films Formed from Hexamethyldisiloxane and SiO by Plasma Process", Kashiwagi et al, Japanese Journal of Applied Physics, vol. 30, No. 8, Aug., 1991, pp. 1803–1807.

*Primary Examiner*—Bruce A. Reynolds
*Assistant Examiner*—Michael D. Switzer
*Attorney, Agent, or Firm*—Nikaido, Marmelstein, Murray & Oram

[57] ABSTRACT

A thin film capacitor composed of a hybrid dielectric thin film that is sandwiched by a pair of electrodes. The hybrid dielectric thin film is obtained by complexing or accumulating first and second regions. The first region is derived from an ion plating source and the second region is derived from another ion plating source containing an auxiliary material to be coupled with the first region, both being obtained through an ion plating process. The use of the auxiliary material ensures a pinhole-free hybrid dielectric thin film.

14 Claims, 5 Drawing Sheets

THIN FILM CAPACITOR AND APPARATUS FOR MANUFACTURING SAME

BACKGROUND OF THE INVENTION

1. Field of the Invention

The present invention relates to a thin film capacitor, and an apparatus for manufacturing the same.

2. Description of the Related Art

Many kinds of capacitors are currently available and are selected for respective uses, for example, paper capacitors, electrolytic capacitors, mica capacitors, ceramic capacitors, plastic film capacitors, and so on. Among these, the plastic film capacitor is most suitable for making a thin film capacitor having minimum size and weight.

The above plastic film is widely used as a dielectric for forming the thin film capacitor; the dielectric material being, for example, organic dielectric materials such as high performance plastic films including films of polyethylene, polycarbonate, polyimide, polytereph-thalate (PET) and polyphenulene sulfite (PPS), but a thin film capacitor that uses an inorganic dielectric material such as silicon oxide, although which usually exhibits a high withstand voltage, is not used widely.

An ion plating process, e.g., a plasma chemical vapor deposition (CVD) process, is superior as a process for forming an inorganic dielectric material, such as silicon oxide, into a thin film because, if an identical thin film is formed by a conventional sintering process, a high temperature of more than 1000° C. is required at a substrate. Conversely, according to the above ion plating process such as, e.g., the plasma CVD process, the related temperature at the substrate can be reduced to 300° C. or less, and therefore, the inorganic thin film can be easily manufactured. Further, according to the plasma CVD process, the dielectric film thickness can be very easily controlled with a high accuracy, and therefore, it is possible to obtain any dielectric constant ($\epsilon$) desired.

Nevertheless, the thin film capacitor comprised of the inorganic dielectric thin film is not practical because it has a fatal defect in that, although the thin film capacitor of the inorganic dielectric may inherently provide a high withstand voltage, as expected, the manufacturing yeild thereof is extremely poor when a mass production thereof is attempted.

It has been found that the reason for the above poor yield is the occurrence of pinholes that are inevitably created inside the inorganic dielectric thin film, and this is the problem to be solved by the present invention.

SUMMARY OF THE INVENTION

Therefore, in view of the above problem, the object of the present invention is to provide a thin film capacitor not having such deleterious pinholes, and an apparatus for manufacturing same.

To attain the above object, the thin film capacitor of the present invention is realized by a hybrid dielectric thin film composed of main regions obtained from an inorganic dielectric material by an ion plating process, and subregions to be coupled with those main regions.

BRIEF DESCRIPTION OF THE DRAWINGS

The above object and features of the present invention will be more apparent from the following description of the preferred embodiments with reference to the accompanying drawings, wherein.

DESCRIPTION OF THE PREFERRED EMBODIMENTS

Before describing the embodiments of the present invention, the prior art and the problems therein wil be first described with reference to the related figures.

Figure 1:
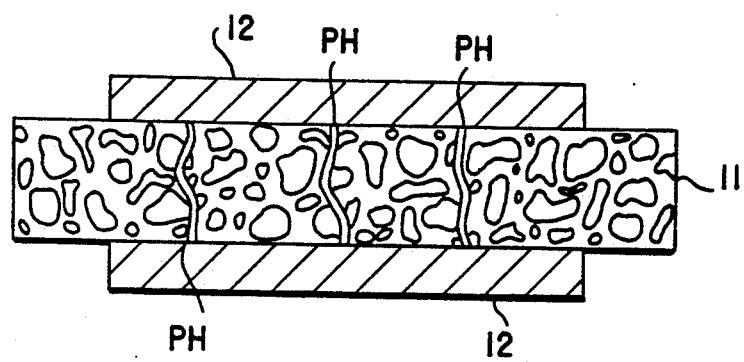
FIG. 1 is a schematic sectional view illustrating a conventional thin film capacitor obtained by a plasma CVD process.

FIG. 1 is a schematic sectional view illustrating a conventional thin film capacitor obtained by a plasma CVD process. In the figure, reference numeral 11 denotes a dielectric thin film obtained by a plasma process. The dielectric thin film 11 is provided with and sandwiched by, at the top surface and bottom surface thereof, a pair of electrodes 12, which can be made of a metal (Al, Ni, Cr and the like, or a doped semiconductor material).

In FIG. 1, inorganic dielectric particles, obtained by a deposition through the plasma CVD process are schematically illustrated as a variety of small enclosures.

Figure 2:
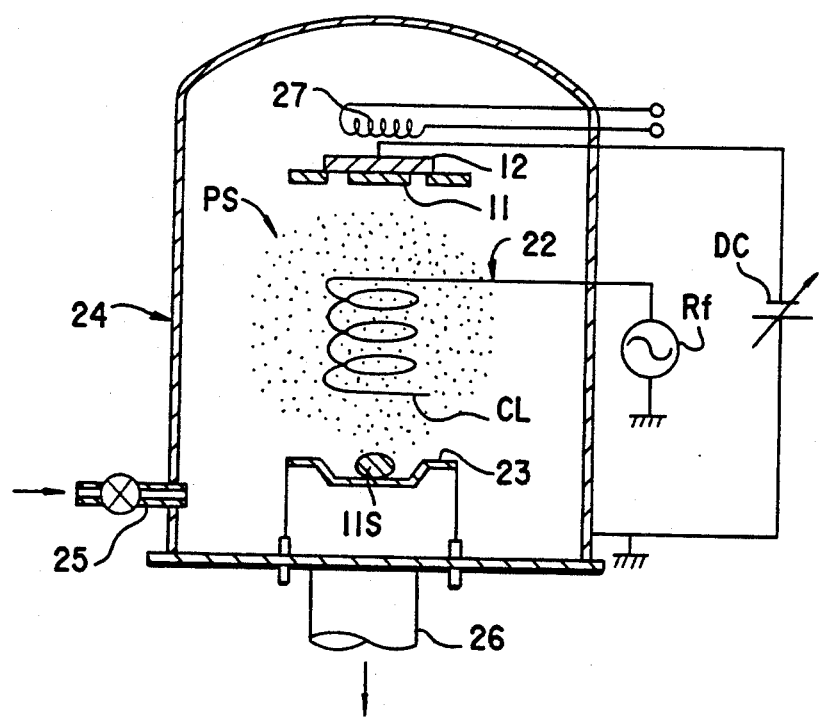
FIG. 2 illustrates a conventional manufacturing apparatus employing a plasma CVD process.

FIG. 2 illustrates a conventional manufacturing apparatus employing a plasma CVD process. This figure shows a process wherein the dielectric thin film 11 of FIG. 1 is deposited; the film 11 is a nucleus of the capacitor.

The manufacturing apparatus is an ion plating apparatus operated under, for example, the plasma CVD process, and a substrate is disposed therein. The substrate is the same as the aforesaid electrode 12 on which the dielectric thin film 11 is to be deposited. The electrode 12 shown in the figure is either one of the electrode pair 12 shown in FIG. 1. The other electrode 12 may be formed, after completion of the dielectric thin film 11, by a known sputtering process, a known ion plating process and the like.

A plasma PS, i.e., a high-frequency plasm discharge, is provided in the vicinity of the aforesaid electrode 12. The plasma PS is generated by a high frequency excitation means 22 constructed by a high frequency electric power source $R_f$ and a high frequency discharge excitation coil CL.

Further, a negative d.c. electric field is applied, if necessary, to the electrode (substrate) 12 by a d.c. power source DC, to thereby obtain a stronger adhesion between the electrode (substrate) and the dielectric thin film.

Further, an inorganic dielectric material supply source 11S and an evaporation means 23 for evaporating the source 11S are disposed so that they face the electrode 12, whereby an ion plating region is deposited on the electrode 12. The evaporation means 23 can be realized by an electron beam, an ion beam and the like.

The above constituents are enclosed by a bell jar 24, to thereby maintain same at a high degree of vacuum via an exhaust vent 26.

The bell jar 24 is filled with an active gas, e.g., oxygen and the like, through a gas inlet system 25, whereby an oxygen plasma PS is excited.

Note, a heater 27 is disposed above the substrate, to heat the electrode 12 to approximately 300° C.

According to the conventional plasma CVD process, as mentioned above, the inorganic dielectric thin film 11, i.e., the nucleus of the thin film capacitor, can be effectively obtained, but as previously mentioned, the thus-obtained thin film capacitor is not practical due to the presence of pinholes inside the dielectric thin film.

Referring again to FIG. 1, the deleterious pinholes are schematically illustrated as narrow pipes, and shown by a reference "PH". The thin film capacitor overcoming the above problem will be explained below.

Figure 3:
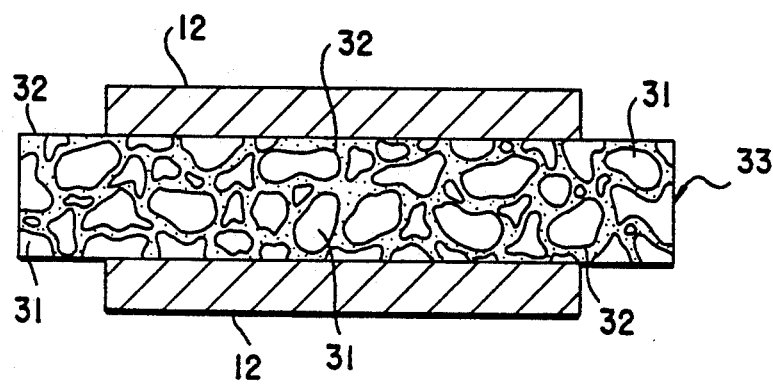
FIG. 3 is a schematic sectional view illustrating a thin film capacitor according to the present invention.

FIG. 3 is a schematic sectional view illustrating a thin film capacitor according to the present invention. As seen from FIG. 3, the dielectric thin film is composed of a first region 31 made of a composition obtained by an ion plating using an inorganic dielectric material as an ion plating source, and a second region 32 made of an auxiliary material to be coupled with the first region 31, and these regions 31 and 32 are complexed or accumulated to form a hybrid dielectric thin film 33.

The above hybrid dielectric thin film 33 is formed mainly by utilizing an ion plating device operated under a high frequency alternating field, in which manufacturing apparatus a material supplier is newly employed as explained later, for the creation of the above second region 32.

According to the present invention, as mentioned above, the hybrid dielectric thin film 33 is composed of the first region 31 and the second region 32 made of the auxiliary material to be coupled with the first region 31, and as a result the occurrence of the aforementioned pinholes PH is greatly suppressed. The details of the mechanism causing the effect as mentioned above have not been clarified at the present stage, but the inventors assume that a composition may be created in the thin film wherein the auxiliary materials forming the above second region 32 infiltrate, as binders, spaces between particulates forming the above inorganic dielectric materials, whereby the composition is given a structure such that pinholes are not liable to occur.

The auxiliary material can be selected from materials exhibiting a dielectric characteristic, at least at the end of the ion plating process. In this case, an organic material or an inorganic material can be used. A compound of these materials is also acceptable.

Figure 4:
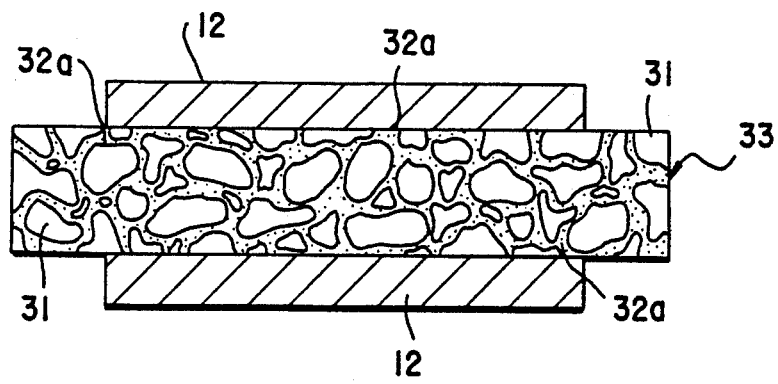
FIG. 4 schematically illustrates a thin film capacitor according to a first embodiment of the present invention.

FIG. 4 schematically illustrates a thin film capacitor according to a first embodiment of the present invention, as a sectional view. Note, identical members are represented by the same reference numerals or symbols throughout the drawings.

In FIG. 4, the hybrid dielectric thin film 33 of the first embodiment contains the second region 32 composed of a material 32a obtained by an ion plating using the auxiliary material as an ion plating source, and made of an inorganic material.

The material 32a can be glass and the like, but if glass is used, it is preferable to apply a heat treatment to the substrate after the deposition of the glass. This is because the molten glass can easily infiltrate the pinholes.

In the above first embodiment, and in the second embodiment as mentioned later, the inorganic dielectric material source can be one of silicon oxides, titanium oxides, chromium oxides, aluminum oxides and semiconductor oxides, or a combination of at least two of those materials.

Figure 5:
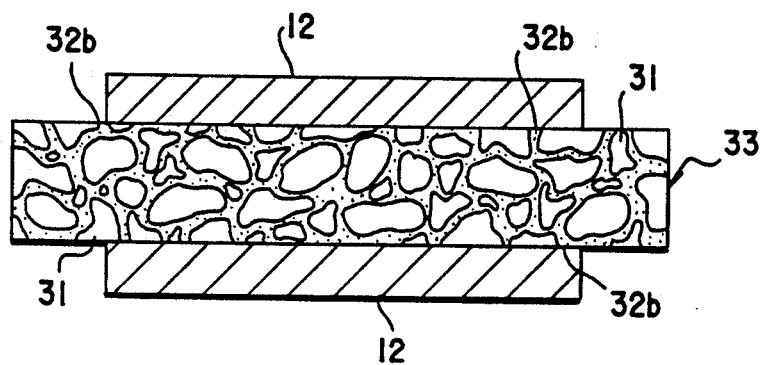
FIG. 5 schematically illustrates a thin film capacitor according to a second embodiment of the present invention.

FIG. 5 schematically illustrates a thin film capacitor according to a second embodiment of the present invention, as a sectional view.

In FIG. 5, the hybrid dielectric thin film 33 of the second embodiment contains the second region 32 composed of a material 32b obtained by a plasma polymerization using, as a plasma polymerization source, an auxiliary material that is an organic material.

The plasma polymerization is known as a high polymer film growth process obtained by a plasma CVD process. This high polymer film growth process is fused with an ion plating, which mainly handles inorganic materials, to thereby form a hybrid dielectric thin film as one body. The hybrid dielectric thin film is finally sandwiched, as a dielectric, by a pair of electrodes 12.

The above material 32b is obtained from a material source that can include for example, organometal compounds including silane compounds, silicates, aluminoxanes, metal alcoholates and the like, or a combination of at least two of these materials.

Alternatively, the above material 32b can be obtained from a material source that can include, for example, polymerizable organic gases such as gases of olefin compounds and/or an organic dielectric compound.

Figure 6:
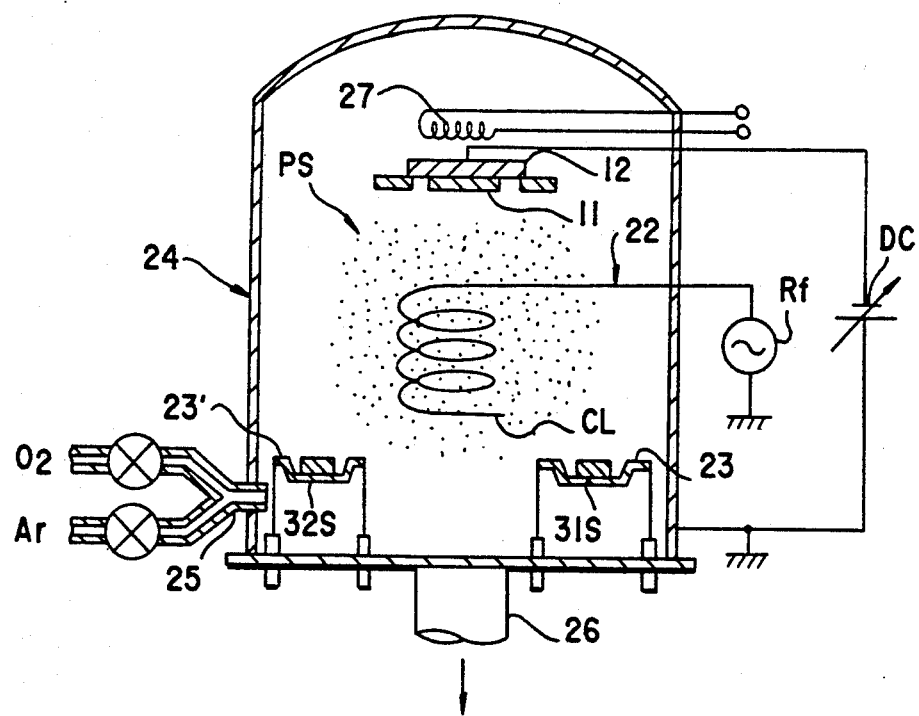
FIG. 6 is a schematic vertical sectional view of a manufacturing apparatus according to a first embodiment of the present invention.

FIG. 6 is a schematic vertical sectional view of a manufacturing apparatus according to a first embodiment of the present invention. The manufacturing apparatus is mainly constructed by an ion plating device operated under a high frequency alternating electric field and constructed by: the electrode 12 acting as a substrate on which the dielectric thin film is deposited; an inorganic dielectric material source 31S for forming, on the electrode 12, the first region 31 made of a composition obtained by an ion plating using an inorganic dielectric material as an ion plating source; an inorganic material source 32S for forming, on the electrodes 12, the second region 32 made of the auxiliary material to be coupled with the first region 31, e.g., a glass containing mainly SiO and/or $SiO_2$; the bell jar 24 maintaining, at a high degree of vacuum, at least the electrode 12, the inorganic dielectric material source 31S and the inorganic material source 32S; and the gas inlet system 25 allowing introduction to the bell jar 24 of at least one of an active gas, e.g., $O_2$ (dioxygen), or an inert gas, e.g., Ar (argon). Further, it is preferable to use an evaporation means 23 and 23' to facilitate an acceleration of the ion plating. The d.c. power source DC has been mentioned with reference to FIG. 2.

Figure 7:
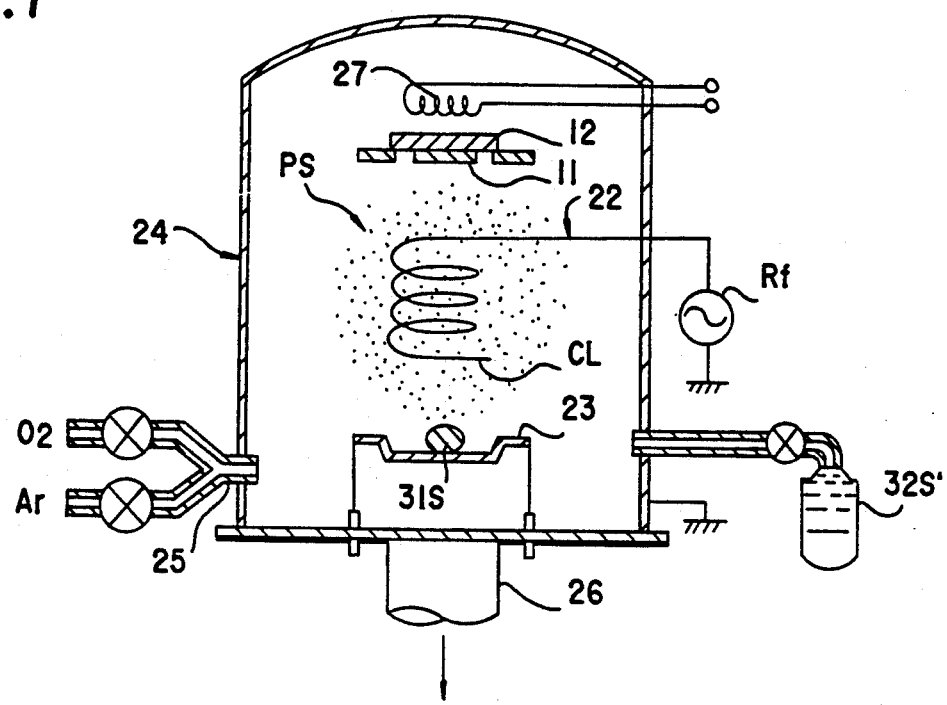
FIG. 7 is a schematic vertical sectional view of a manufacturing apparatus according to a second embodiment of the present invention.

FIG. 7 is a schematic vertical sectional view of a manufacturing apparatus according to a second embodiment of the present invention. The manufacturing apparatus is mainly constructed by an ion plating device, as in the first embodiment (FIG. 6), operated under a high-frequency alternating electric field and constructed by: the electrode 12 acting as a substrate on which the dielectric thin film is deposited; the inorganic dielectric material source 31S for forming, on the electrode 12, the first region 31 made of a composition obtained by an ion plating using an inorganic dielectric material as an ion plating source; an organic substance-containing material source 32S' for forming, on the electrode 12, the second region 32 made of the auxiliary material to be coupled with the first region 31; the bell jar 24 maintaining, at a high degree of vacuum, at least the electrode 12, the inorganic dielectric material source 31S and organic substance containing material source 32S'; and the gas inlet system 25 allowing the introduction to the bell jar 24, of at least either one of an active gas, e.g., $O_2$ (dioxygen) or an inert gas, e.g., Ar (argon).

The organic substance containing material source 32S' shown in FIG. 7 is, for example, a polymerizable monomer gas such as an olefin compound gas.

Figure 8:
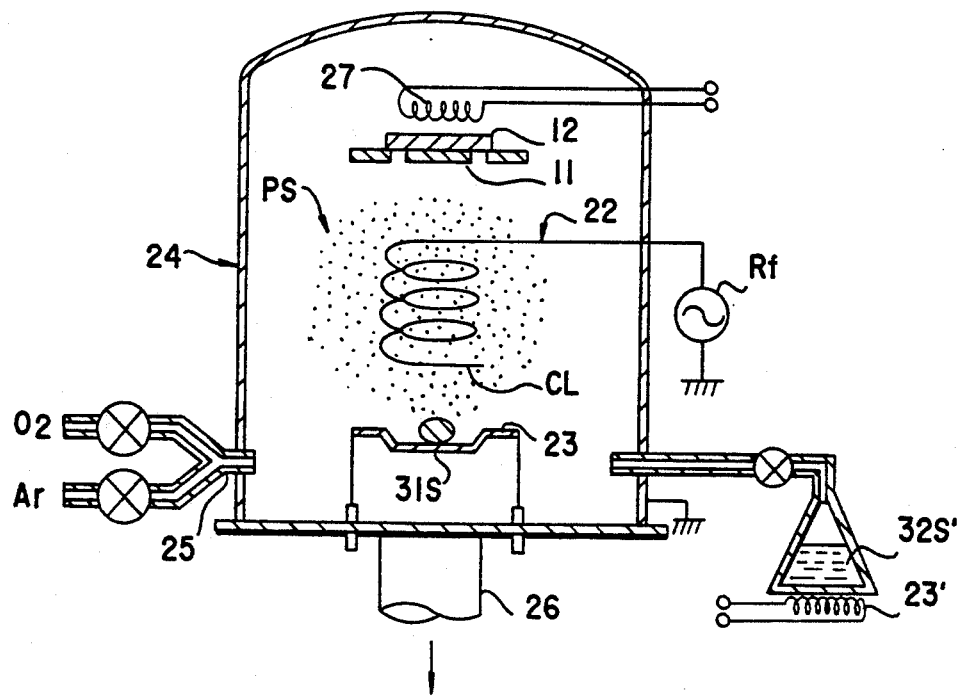
FIG. 8 illustrates a first modification based on the second embodiment shown in FIG. 7.

FIG. 8 illustrates a first modification based on the second embodiment shown in FIG. 7. In FIG. 8, the organic substance containing material source 32S' is a vaporizable liquid type organic material (including an organometal compound) such as a silane compound and the like. Preferably, the evaporation means 23' is used to accelerate the above vaporization.

Figure 9:
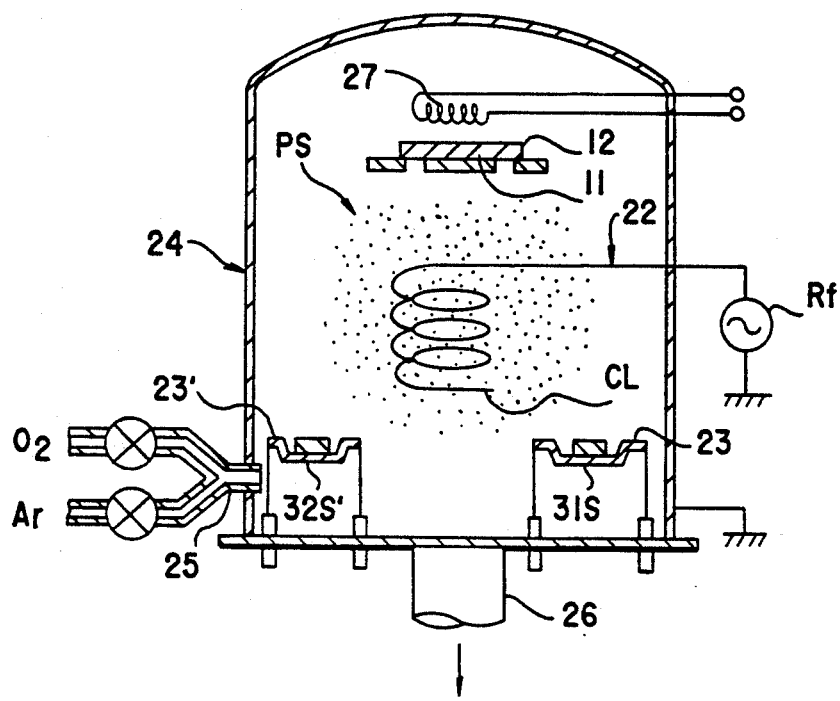
FIG. 9 illustrates a second modification based on the second embodiment shown in FIG. 7.

FIG. 9 illustrates a second modification based on the second embodiment shown in FIG. 7. In FIG. 9, the organic substance containing material source 32S' includes, for example, a propylene monomer, butadiene monomer, polystyrene, ethylene, polyethylene or hexamethyldisiloxane and the like, which can be converted into an organic polymer by plasma CVD.

Note, although the high frequency discharge excitation coil CL is disposed inside the bell jar 24, in the first and second embodiments, as a means for generating a high frequency alternating electric field, it should be understood that the coil CL may be wound outside the bell jar 24. In this case, the bell jar 24 must be made of a non-metallic material such as glass.

EXAMPLE i) A hexamethyldisiloxane was used as the aforesaid organic substance containing material (see the material 32S' in FIG. 8) expressed by the following chemical formula.

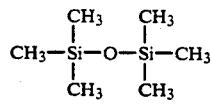

ii) A silicon monoxide (SiO) was used as the aforesaid inorganic dielectric material source 31S.

iii) The pressure of the organic gases was $4 \times 10^{-4}$ Torr.

iv) The power of the aforesaid high frequency electric power source $R_f$ was 100 W.

v) An electron beam device was used as the aforesaid evaporation means 23 for melting the material source 31S (SiO) having a high melting point. The electron beam was irradiated onto the surface of the SiO.

vi) An oxygen ($O_2$) was used as the active gas injected through the gas inlet system 25.

vii) The temperature of the heater 27 was set at 300° C.

viii) an aluminum (Al) thin plate was used as the aforesaid substrate (12).

Further an argon (Ar) gas was used, as an inert gas, to maintain the plasma.

The other electrode 12 was added by a sputtering process to the aforesaid hybrid dielectric thin film 33 200 Å thick obtained by the aforesaid embodiment. Then a withstand voltage test was obtained with respect to the thus fabricated thin film capacitor, and a value of 5.4 [MV/cm] obtained as a dielectric breakdown strength. Further, the thin film capacitor includes no pinhole, and therefore, exhibits an extremely good yield. Namely, no defect was found that exhibits OV as a withstand voltage.

Note, the thin film capacitor of the above example had a capacity of 4800 [nF], a dielectric constant of 10843, and a performance index of 128 [$\mu C/cm^2$].

Figure 10:
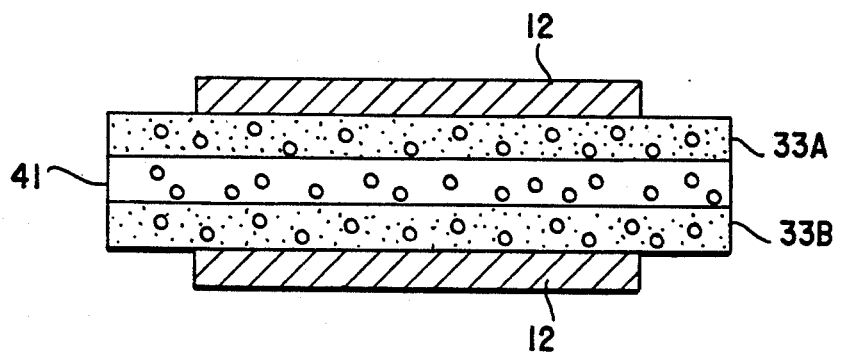
FIG. 10 illustrates a modification of the thin film capacitor according to the present invention.

FIG. 10 illustrates a modification of the thin film capacitor according to the present invention. An insulation layer 41 is further added to the thin film capacitor of FIG. 3 at the center thereof. Thus the capacitor has a structure such that the insulation layer 41 is sandwiched by a pair of hybrid dielectric thin films 33A and 33B.

A pinhole-free thin film can be ensured only by the hybrid dielectric thin film 33, and if the insulation layer 41 is further inserted between the top side film 33A and the bottom side film 33B, the safety factor against the occurrence of pinholes can be greatly improved. The insulation layer can be made of $SiO_2$ or of a glass.

As explained above, the present invention provides a thin film capacitor containing therein an inorganic-inorganic type hybrid dielectric thin film or an inorganic-organic type hybrid dielectric thin film not obtained before. This produces several advantages, as follows:

(1) The thin film capacitor is pinhole-free, and therefore, the manufacturing yield is greatly improved.

(2) The hybrid dielectric thin film exhibits a good adhesion to the substrate, i.e., the electrode, and therefore, the capacitor is structurally very strong even if the thin films are laminated as many layers.

(3) The control of the thickness of the hybrid dielectric thin film is very easy, since an ion plating process such as a plasma CVD is used to form same. Therefore, thin film capacitors can be manufactured by mass production while keeping each dielectric constant at a desired value with high accuracy.

(4) It is sufficient to heat the substrate (12) at a relatively low temperature, since an ion plating process such as a plasma CVD is used. This means that any impurity is prevented from entering the hybrid dielectric thin film.

We claim:

1. A thin film capacitor comprising:
a pair of electrodes;
a hybrid dielectric thin film sandwiched between said pair of electrodes, said hybrid dielectric thin film comprising both a first region and a second region, said first region comprising inorganic dielectric material accumulated by an ion plating process, and said second region comprising organic material, said second region being coupled with said first region.

2. A thin film capacitor as set forth in claim 1, wherein said organic material is selected from materials exhibiting a dielectric characteristic at least at an end of said ion plating process, and acting as binders to thereby ensure a pinhole-free thin film.

3. A thin film capacitor as set forth in claim 2, wherein said second region is composed of an organic material obtained through a plasma polymerization using materials containing an organic material as a plasma polymerization source.

4. A thin film capacitor as set forth in claim 3, wherein said plasma polymerization source is polymerizable organic gas of at least one of a gas of olefin compound and an organic dielectric compound.

5. A thin film capacitor as set forth in claim 3, wherein said plasma polymerization source is a material that can be converted into an organic polymer by plasma CVD, and selected from at least one of propylene monomer, butadiene monomer, polystyrene, ethylene, polyethylene, and hexamethyldisiloxane.

6. A thin film capacitor as set forth in claim 3, wherein said first region is obtained from said ion plating source selected from at least one of silicon oxides, titanium oxides, chromium oxides, aluminum oxides and semiconductor oxides.

7. A thin film capacitor as set forth in claim 1, wherein said ion plating is formed by a plasma chemical vapor deposition (CVD) process.

8. A thin film capacitor as set forth in claim 7, wherein said inorganic dielectric material is selected from at least one of silicon oxides, titanium oxides, chromium oxides, aluminum oxides and semiconductor oxides.

9. A thin film capacitor as set forth in claim 1, wherein said ion plating process is formed by a plasma chemical vapor deposition (CVD) process.

10. A thin film capacitor as set forth in claim 9, wherein one of said electrodes serves as a substrate in said plasma CVD process and the other electrode is formed, after said plasma CVD process, by a sputtering process, an ion plating process and the like.

11. A thin film capacitor as set forth in claim 2, wherein said hybrid dielectric thin film is divided into two layers and an insulation layer is further inserted therebetween.

12. A thin film capacitor as set forth in claim 11, wherein said insulation layer is made of at least one of $SiO_2$ and a glass.

13. An apparatus for manufacturing a dielectric thin film of a thin film capacitor, said apparatus being an ion plating device operated under a high frequency alternating electric field, said apparatus comprising:
an electrode acting as a substrate on which a dielectric thin film is deposited;
an inorganic dielectric material source for forming, on said electrode, a first region made of a composition obtained by an ion plating using an inorganic dielectric material as an ion plating source;
an organic substance containing material source for forming, on said electrode, a second region to be coupled with said first region by a plasma polymerization;
a bell jar maintaining, at a high degree of vacuum, at least said electrode, said inorganic dielectric material source and said organic substance containing material source; and
a gas inlet system allowing an introduction to said bell jar of at least one of an active gas and an inert gas.

14. A thin film capacitor comprising:
a pair of electrodes;
a hybrid dielectric thin film sandwiched between said pair of electrodes, said hybrid dielectric thin film comprising a first region and a second region, said first region comprising inorganic dielectric material accumulated by an ion plating process, and said second region comprising auxiliary material, said second region being coupled with said first region, said auxiliary material is selected from inorganic materials exhibiting a dielectric characteristic at least at the end of said ion plating process, and acting as binders to thereby ensure a pinhole-free thin film, wherein said second region is composed of a material obtained by said ion plating using a glass mainly containing SiO and/or $SiO_2$ as an inorganic ion plating source.

* * * * *